(12) United States Patent
Shrivastava et al.

(10) Patent No.: US 11,023,948 B2
(45) Date of Patent: Jun. 1, 2021

(54) ADAPTIVE PAYMENT CARD SYSTEM AND PROCESS

(71) Applicant: Mastercard International Incorporated, Purchase, NY (US)

(72) Inventors: Sachin Shrivastava, Pune (IN); Ajitesh Pandey, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 313 days.

(21) Appl. No.: 15/980,370

(22) Filed: May 15, 2018

(65) Prior Publication Data

US 2018/0374139 A1    Dec. 27, 2018

(30) Foreign Application Priority Data

Jun. 23, 2017  (SG) .............................. 10201705221T

(51) Int. Cl.
| G06Q 30/00 | (2012.01) |
|---|---|
| G06Q 30/06 | (2012.01) |
| G06Q 20/34 | (2012.01) |
| G06Q 30/02 | (2012.01) |

(52) U.S. Cl.
CPC ......... *G06Q 30/0631* (2013.01); *G06Q 20/34* (2013.01); *G06Q 20/3572* (2013.01); *G06Q 30/0201* (2013.01)

(58) Field of Classification Search
CPC ................................................... G06Q 30/00
See application file for complete search history.

(56) References Cited

U.S. PATENT DOCUMENTS

| 6,672,505 | B1 | 1/2004 | Steinmetz et al. | |
|---|---|---|---|---|
| 6,684,195 | B1 | 1/2004 | Deaton et al. | |
| 8,762,263 | B2 | 6/2014 | Gauthier et al. | |
| 8,812,351 | B2 | 8/2014 | Zollino et al. | |
| 10,380,583 | B1* | 8/2019 | Ellis ..................... | G06Q 20/388 |
| 10,467,613 | B2* | 11/2019 | Yoon ..................... | G06Q 20/325 |
| 10,671,983 | B2* | 6/2020 | Mohrlock ............... | G06Q 20/08 |
| 2003/0225742 | A1* | 12/2003 | Tenner ................... | G06Q 30/02 |
| 2005/0055296 | A1* | 3/2005 | Hattersley .............. | G06Q 40/00 |
| | | | | 705/35 |
| 2011/0010237 | A1 | 1/2011 | Shakkarwar | |

(Continued)

FOREIGN PATENT DOCUMENTS

WO      2015009427 A1      1/2015

OTHER PUBLICATIONS

Wallet, "Maximize Credit Card rewards—Wallet by Creditcards.com", Creditcards.com, dated Oct. 18, 2016 (Year: 2016).*

(Continued)

*Primary Examiner* — Mark A Fadok

(57) ABSTRACT

The present invention provides an adaptive payment card system and process for providing a customer (referred to herein as a "cardholder") with a payment card (referred to herein as an "adaptive" payment card) that is issued by an issuing financial institution (an "issuer"), and linked to a card entity (such as MasterCard), where the product associated with the adaptive payment card can be changed without modification to the corresponding payment card and without requiring issuance of a new payment card.

21 Claims, 8 Drawing Sheets

(56) References Cited

U.S. PATENT DOCUMENTS

| | | | | |
|---|---|---|---|---|
| 2014/0136353 | A1* | 5/2014 | Goldman | G06Q 20/405 |
| | | | | 705/21 |
| 2015/0142657 | A1* | 5/2015 | Sagastiverza | G06Q 20/32 |
| | | | | 705/44 |
| 2016/0071086 | A1* | 3/2016 | Malone | G06Q 30/06 |
| | | | | 705/39 |
| 2017/0024724 | A1* | 1/2017 | Kwak | G06Q 20/227 |
| 2017/0046686 | A1* | 2/2017 | Yoon | G06Q 20/227 |
| 2017/0201779 | A1* | 7/2017 | Publicover | H04N 21/4532 |
| 2018/0121895 | A1* | 5/2018 | Mohrlock | G06Q 20/38 |
| 2019/0147478 | A1* | 5/2019 | Umemura | G06Q 30/0229 |
| | | | | 705/14.3 |

OTHER PUBLICATIONS

"PCT Notification of Transmittal of the International Search Report and the International Written Opinion" dated Jul. 23, 2018, International Searching Authority, for International Application No. PCT/US2018/032620, 13 pp.

* cited by examiner

ADAPTIVE PAYMENT CARD SYSTEM AND PROCESS

CROSS-REFERENCE TO RELATED APPLICATION

This application is a U.S. National Stage filing under 35 U.S.C. § 119, based on and claiming benefits of and priority to Singaporean Patent Application No. 10201705221T filed on Jun. 23, 2017. The entire disclosure of the above application is incorporated herein by reference for all purposes.

TECHNICAL FIELD

The present invention relates to an adaptive payment card system and process for dynamically associating a payment card to financial products of an issuer.

BACKGROUND

The use of electronic payment services has increased dramatically in recent decades. In particular, credit and debit card-based payment services have become integrated into everyday life due to their ability to allow a customer to complete purchases via the electronic transfer of funds to a merchant's account. Card-based payments offer many advantages over cash payments, including that the customer can provide a merchant with a payment in any currency without needing to transport physical denominations or having to manually perform conversions from one currency type to another, while retaining the efficiency of a cash exchange. The popularity of card based payment services has resulted in the development of a wide variety of products for these services. Consequently, the particular product associated with a payment card issued to a customer is often significant in determining the benefit that the customer derives from using their card.

There are specific shortcomings with existing card-based payment technologies. A payment card is typically used in association with a particular financial product and a corresponding payment account, as provided to a customer by an issuing financial institution (referred to herein as the "issuer"). The financial product typically specifies a set of rules and/or conditions for using the card to conduct transactions with the account, and one or more parameters that determine the financial characteristics of the product. A selection of different financial products is typically offered to a customer by the issuer together with respective payment cards, and a customer selecting one of those financial products is provided with the corresponding card to allow use of the selected product (i.e., by performing financial transactions with the payment card). For example, a bank may offer a variety of different credit or debit products for a customer to use via respective payment cards (e.g., credit or debit cards), where each product has different benefits and/or conditions that determine the type of transactions that can be performed on the card associated with the product, and different interest rates and/or other fees associated with transactions made with the card.

In conventional payment card systems, each financial product offered by an issuer is thus associated with a different physical payment card that is provided by the issuer to the customer, even if one or more products operate in relation to a single common payment account of the customer. This approach has several drawbacks. First, the customer can be inconvenienced in the case that they elect to change to a different card-based product from the selection of products offered by a particular issuer. For example, a customer may change their product type from a debit to a credit based product. When this product change is initiated, the customer is required to wait for a credit type payment card to be provisioned in order to be able to use the new credit card product (i.e., to perform transactions with the card). This is also costly for the issuer, because resources are required to manufacture and customise the physical cards, and significant resources are expended by the issuer for the purpose of distributing the new payment cards to customers who are changing from one product to another.

Furthermore, in conventional approaches used by issuers to present customers with payment products, there is no feedback made available to the customer in relation to their current product usage. That is, issuers typically allow the customer to select a product and to continue to use that product until the customer submits a request to change their product, or sign up for a new product, which often occurs as a result of the customer's own initiative. This is not optimal for the customer, since they may be unaware of their usage in relation to their current product, and/or of other products offered by the issuer that might better suit their needs. By failing to leverage their knowledge of a customer's expenditure history in order to proactively present the customer with the products of the issuer that would be of the most benefit to the customer, the issuer also risks losing the customer to a competitor.

Despite the convenience of these payment technologies, there remains room for improvement. It is desired to provide a payment card system and process that alleviate one or more difficulties of the prior art, or to at least provide a useful alternative.

SUMMARY

In a first aspect, there is provided a payment system, comprising:
  a transaction processing device configured to process transaction information about payment card transactions of a cardholder of an issuing institution made using a payment card issued to the cardholder by the issuing institution and being made in association with a corresponding financial product of the issuing institution, said transaction processing device including:
    a transaction database storing transaction data indicative of the payment card transactions of the cardholder;
    a payment card database storing payment card data, said payment card data including product association data representing the association of the payment card of the cardholder with the corresponding financial product of the issuing institution; and
    a financial product database storing financial product data representing a plurality of financial products of the issuing institution, the financial products including the financial product of the issuing institution associated with the payment card of the cardholder;
  a product recommendation engine including:
    a communications interface to receive data;
    at least one computer processor to execute program instructions; and a memory, coupled to the at least one computer processor, to store program instructions for execution by the at least one computer processor to automatically:
    access the transaction data of the cardholder stored in the transaction database and financial product data of the financial product database;

analyze the transaction data and the financial product data to evaluate financial products of the issuing institution with respect to the payment card transactions of the cardholder;

generate, based on the evaluation, recommended product data representing one or more recommended financial products of the issuing institution, the recommended financial products being financial products that are recommended by the issuing institution as alternatives to the financial product of the issuing institution that is currently associated with the payment card of the cardholder;

transmit, via a communications network, the recommended product data to a cardholder device of the cardholder;

receive, via the communications network, product confirmation data including an indication of one of the one or more alternative financial products selected by the cardholder; and update the payment card database to store product association data representing an association of the payment card of the cardholder with the selected recommended financial product of the issuing institution, such that future payment transactions made using the payment card will be made in association with the selected recommended financial product of the issuing institution.

In a second aspect, there is provided a process for associating a financial product of an issuing institution with a payment card, including:

analysing, at a product recommendation engine of the issuing institution:

transaction data indicative of the payment card transactions of a cardholder made using a payment card issued to the cardholder by the issuing institution and being made in association with a corresponding financial product of the issuing institution; and financial product data representing a plurality of financial products of the issuing institution, the financial products including the financial product of the issuing institution associated with the payment card of the cardholder, to evaluate financial products of the issuing institution with respect to the payment card transactions of the cardholder;

generating, at the product recommendation engine and based on the evaluation, recommended product data representing one or more alternative financial products of the issuing institution, the alternative financial products being financial products that are recommended by the issuing institution as alternatives to the financial product of the issuing institution associated with the payment card of the cardholder;

transmitting, from the product recommendation engine and via a communications network, the recommended product data to a cardholder device of the cardholder;

receiving, at the product recommendation engine and via the communications network, product confirmation data including an indication of one of the one or more alternative financial products selected by the cardholder; and updating, at the product recommendation engine, the payment card database to store product association data representing an association of the payment card of the cardholder with the selected alternative financial product of the issuing institution, such that future payment transactions made using the payment card will be made in association with the alternative financial product of the issuing institution.

BRIEF DESCRIPTION OF THE DRAWINGS

Some embodiments of the present invention are hereinafter described, by way of example only, with reference to the accompanying drawings, wherein.

DETAILED DESCRIPTION

Figure 1:
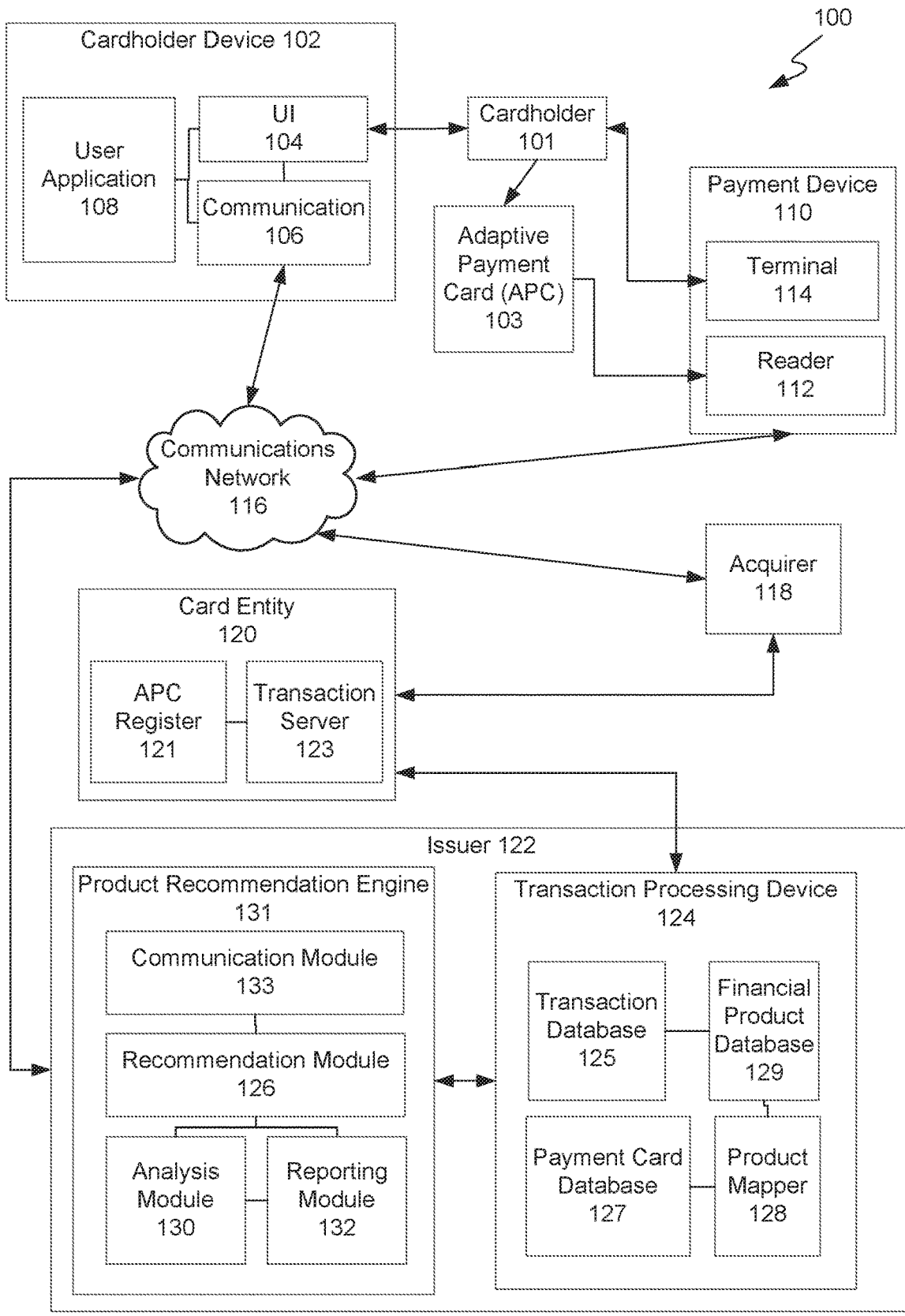
FIG. 1 is a block diagram of an adaptive payment card system in accordance with some embodiments of the present invention.

The described embodiments of the present invention include an adaptive payment card system and process for providing a customer (referred to herein as a "cardholder") with a payment card (referred to herein as an "adaptive" payment card) that is issued by an issuing financial institution (an "issuer"), and linked to a card entity (such as MasterCard), where the product associated with the adaptive payment card can be changed without modification to the corresponding payment card and without requiring issuance of a new payment card. Specifically, a cardholder can elect to "upgrade" or otherwise change the product associated with the adaptive payment card (the "current product") by selecting a particular product from a set of one or more products that are recommended by the issuer ("recommended products"). The recommended products are determined by a product recommendation engine of the issuer based on the usage of the product currently associated with the adaptive payment card (i.e., the payment transactions made by the cardholder with the adaptive payment card in respect of the current product). The adaptive payment card system analyses payment transaction data, and other data collected in relation to the adaptive payment card, within a recommendation assessment period, and determines the one or more recommended products to be presented to the cardholder. If the cardholder elects to change their current product to a selected one of the recommended products (the "new product"), the adaptive payment card system performs the product change by associating the adaptive payment card with the new product in accordance with existing issuer processes for issuing a product to a customer. After the completion of the product change, the cardholder can then complete transactions in respect of the new product with the same payment card, and without requiring a new payment card to be issued for the new product.

In the described embodiments, the product recommendation engine determines the one or more recommended products for a particular adaptive payment card by performing pattern classification and/or statistical analysis on the payment transaction data associated with the adaptive payment card, as collected over the recommendation assessment period. In the described embodiments, the recommendation assessment period is a period of fixed and predetermined duration that commences at a predetermined time following the association of a particular product with the adaptive payment card (e.g., at the time of issuance of the card, and when a product change is successfully performed with respect to the card). In some embodiments, the one or more recommended products are selected from a set of predetermined products of the issuer. In some embodiments, the issuer determines one or more customised recommended products with properties that are dynamically set based on the data collected and processed in relation to the cardholder and their usage of the current product. In presenting the one or more recommended products to the cardholder, the adaptive payment card system can be configured to provide the cardholder with product usage data in the form of a usage report, which allows the cardholder to observe the potential benefits of each of the one or more recommended products in view of their usage of the current product.

In the described embodiments, the adaptive payment card system includes a payment card database that stores product association data representing a mapping or association between the fixed payment card number (printed, embossed otherwise visible on the payment card) and a new 'virtual' card number that is assigned to the cardholder for the new product selected by the cardholder. For convenience of implementation, this virtual card number is in the form of a conventional payment card number, and can be considered to be the number of the payment card that would have been manufactured and issued to the customer in a conventional payment card system in response to the customer changing to the new payment card product. For convenience of description, this new card, which never exists as a physical article, but only as data of the payment card system, is referred to as a virtual payment card. The virtual payment card thus represents the payment card that would be issued to the cardholder for the particular product in a conventional system, and has associated virtual payment card data including: a card number, Interbank Card Association (ICA) value, expiry date, and Card Verification Value (CVV) code. The virtual payment card data is maintained within the payment card database and is used by a product mapper service of a transaction processing device to resolve an adaptive payment card number, as received within a payment transaction, to the corresponding virtual payment card number and subsequently to the appropriate payment account of the cardholder. This allows payment transactions to proceed using conventional processing steps implemented by an acquirer, a card entity, and an issuer in accordance with standard financial message transaction protocols (such as the ISO 8583 standard).

The cardholder interacts with the product recommendation engine of the issuer for the purpose of changing the current product associated with their adaptive payment card. Specifically, the cardholder receives an automatic notification from the product recommendation engine of the issuer when product recommendations are available, allowing the cardholder to select a new product from the one or more recommended products, and to finalise the product change process by activating the new product. In the described embodiments, the cardholder interacts with the product recommendation engine of the issuer via a mobile computing device ("cardholder device") such as a smartphone. The system can be configured to allow a cardholder to interact with the product recommendation engine of the issuer via any arbitrary electronic communication process occurring between respective issuer and cardholder devices, such as via SMS, a dedicated software application provided by the issuer executing on a cardholder device, a generic web browser application operated by the cardholder to access the Internet Banking Service (IBS) of the issuer, or a voice/video call. In some embodiments, the cardholder can utilise other means to interact with the issuer, such as via an Automatic Teller Machine (ATM) or service kiosk.

The adaptive payment card system and process described herein therefore advantageously provide a platform for presenting a cardholder with an adaptive payment card that can be associated with an arbitrary payment card product of the issuer, and that:

1) provide the cardholder with flexibility and convenience during the process of changing their card based product by allowing the modification of the product associated with an adaptive payment card, such that the cardholder can perform payment transactions with the new product without requiring a replacement payment card from the issuer;
2) reduce the resource consumption of the issuer by alleviating the need to manufacture a new physical payment card whenever a cardholder decides to change their current product to a new product of the issuer;
3) provide a cardholder with information in relation to the usage of an issuer product that is currently associated with the adaptive payment card, and allow the cardholder to easily change to a new product from a set of recommended products that are specifically identified as being beneficial to the cardholder; and
4) improves the process of providing cardholders with card based payment upgrade options by analysing the use of their current product, and automatically engaging the cardholder with respect to changing this product, therefore providing benefit to the cardholder and the issuer.

System

As shown in FIG. 1, an adaptive payment card system 100 includes a cardholder device 102, such as a smart phone, tablet or computer, operated by a cardholder 101 and in communication with an issuer 122 via a communications network 116. The cardholder 101 operates the cardholder device 102 for the purpose of interacting with a product recommendation engine 131 of the issuer 122 to associate an adaptive payment card 103 of the cardholder 101 with a particular product of the issuer 122. The cardholder device 102 includes a user interface (UI) module 104 for accepting user input from the cardholder 101, or any other user of the cardholder device 102, a communications module 106 for transmitting and receiving data, and a user application 108 which facilitates the process by which the cardholder 101 can select a recommended product for the adaptive payment card 103 and activate this product (as described below).

In the described embodiments, the user application 104 is a mobile application that enables electronic communication between the cardholder 101 and the issuer 122, such as a mobile banking application provided by the issuer 122, or a web browser application that renders the webpages of an Internet Banking Service (IBS) of the issuer 122. In other embodiments, the user application 108 can be an application that allows for SMS, voice, and/or video call based communication to occur between the cardholder 101 and the issuer 122.

The system 100 includes a payment device 110 that is used by the cardholder 101 to make a payment transaction with the adaptive payment card 103. The payment device 110 includes a reader 112 configured to scan or read the adaptive payment card 103 in order to identify corresponding payment card data, and a terminal 114 configured to accept security verification input that verifies the authorisation of the cardholder 101 to make a payment with the adaptive payment card 103 (such as, for example, a PIN code). In the described embodiments, the adaptive payment card 103 is a standard financial magnetic stripe card in accordance with the ISO/IEC 7813 international standard. The adaptive payment card stores payment card data including: the cardholder name; an indication of the primary account number (PAN) of a payment account of the cardholder; the expiration date of the card; a service code; and a discretionary data value, such as a PIN verification key indicator, a PIN verification value, a card verification value (CVV) or a card verification code (CVC).

The payment card data of the adaptive payment card 103 may also be stored on an integrated circuit embedded within the card in accordance with the ISO/IEC 7816-1 international standard. The payment device 110 is configured to process payment transactions made with a financial payment card, such as the adaptive payment card 103, via communication with a device of an acquirer 118. The payment device 110 can be a merchant POS terminal, an automatic teller machine (ATM), or any other device capable of making a payment transaction with a payment card. In the described embodiments, the payment device 110 communicates with the acquirer 118 via the communications network 116. In other embodiments, the payment device 110 can be configured to communicate directly with the acquirer 118, such as for example in the case of an ATM that is physically connected to the secure local network of a financial institution. In some embodiments, the cardholder device 102 can be the payment device 110. For example, a cardholder 101 may interact with the issuer 122 via an ATM or service kiosk to both make a payment transaction with the adaptive payment card 103, and to upgrade the product associated with the adaptive payment card 103.

The payment transactions made with the adaptive payment card 103 via the payment device 110 are processed according to standard financial transaction protocols, such as the ISO 8583 message protocol. The acquirer 118 is configured to forward a payment transaction made with the adaptive payment card 103 to a transaction server 123 device of a card entity 120 that is linked to the adaptive payment card 103. The transaction server 123 is configured to process payment transactions received from the acquirer 118 and to transmit corresponding transaction data to a transaction processing device 124 of the issuer 122 via a transaction consolidation process. The card entity 120 also includes an adaptive payment card (APC) register 121 that allows the card entity 120 to identify payment transactions made from the adaptive payment card 103 of the cardholder 101.

In the described embodiments, the devices of the issuer 122 communicate with the cardholder device 102 via communications network 116, and with the card entity 120 via a local area network in the form of existing financial services infrastructure connecting the card entity to the issuer. The communications network 116 can be a local or wide area network, or a combination of a plurality of different local or wide area sub-networks. The transaction processing device 124 of the issuer 122 is configured to receive payment transactions from the card entity 120 and to perform the transaction on a payment account of the cardholder 101 in accordance with the product that is associated with the adaptive payment card 103 at the time of the transaction.

During an upgrade of the system 100 or any component of the system 100, generally, the payment card 103 would be in a block mode (or disabled) till the requisite upgrade is completed and is approved by issuer. An actual process may vary based on processing practices of the issuer.

The transaction processing device 124 includes a transaction database 125, a payment card database 127, a financial product database 129 and a product mapper 128. A payment transaction is processed by the product mapper 128 of the transaction processing device 124 to determine whether the transaction is made from an adaptive payment card provided by the issuer 122. The product mapper 128 is configured to determine the product associated with the adaptive payment card 103 at the transaction time (i.e. the current product) based on payment card data stored in the payment card database.

The association of a particular product with an adaptive payment card 103 is represented by a mapping between the adaptive payment card data and payment card data of a virtual payment card representing the product (as described herein below). The recommendation module 126 of the product recommendation engine 131 provides functionality that enables the generation of recommended products from which the cardholder 101 can select for association with the adaptive payment card 103, and determines whether a particular received payment transaction is to be analysed by the analysis module 130 for this purpose. The reporting module 132 receives analysis data from the analysis module 130, and generates usage report data that reports aspects of the usage of the current product by the cardholder 101. The reporting module 132 is invoked by the updater module 126 to provide report data to the cardholder 101 in order to assist the cardholder with making a product update decision, or for any other purpose.

Figure 2:
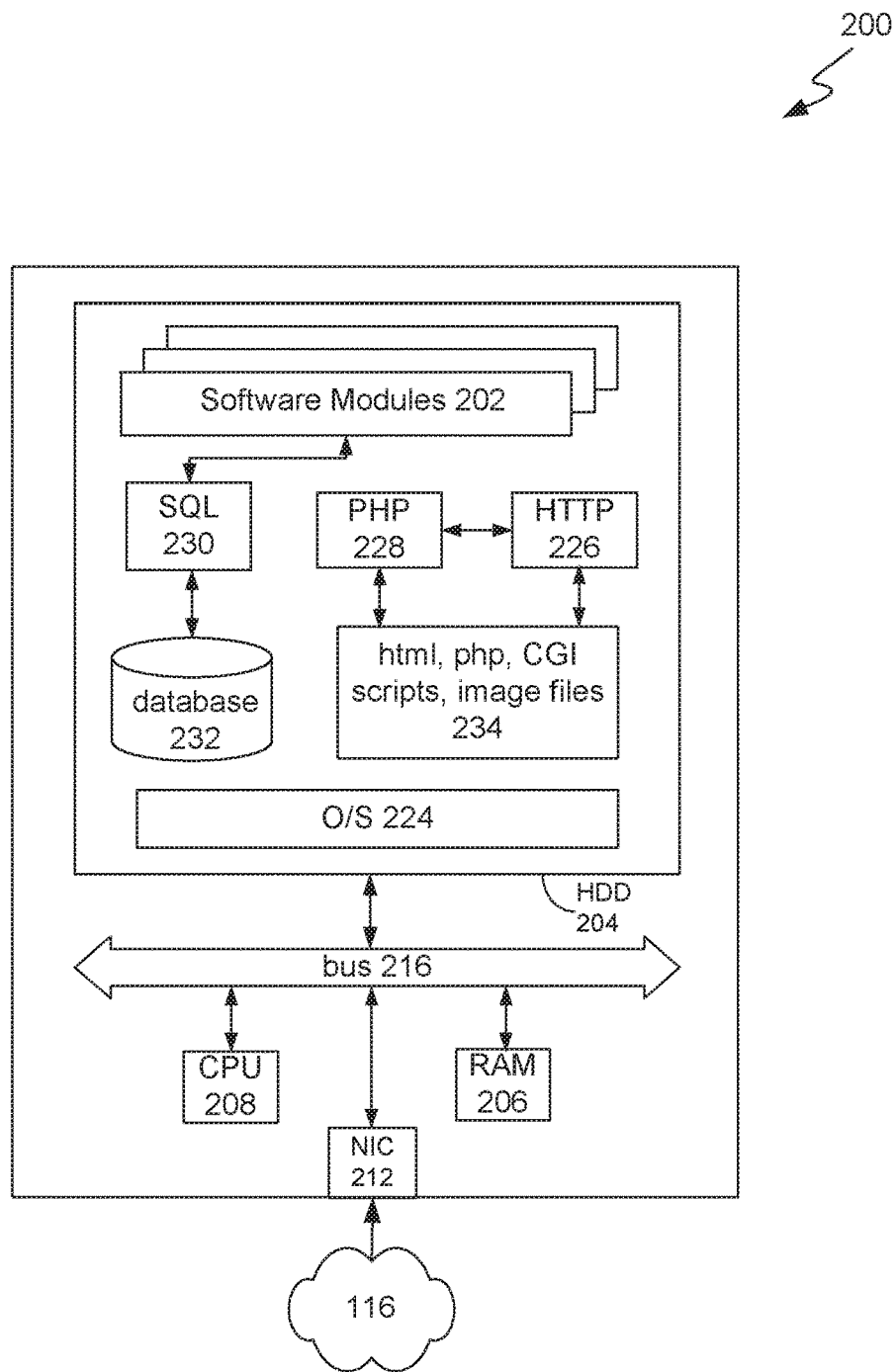
FIG. 2 is a block diagram of a computing device of the adaptive payment card system.

In the described embodiments of the adaptive payment card system 100, the cardholder device 102, payment device 110, card entity 120 devices (including the transaction server 123 and the APC register 121), acquirer 118 devices, and issuer 122 devices (including the transaction processing device 124 and the computing device(s) on which the product recommendation engine 131 is executed) are computer systems 200 such as, for example, an Intel IA-32 based computer system, as shown in FIG. 2, and the processes 300 and 800 executed by the system 200 are implemented as programming instructions of one or more software modules 202 stored on non-volatile (e.g., hard disk or solid-state drive) storage 204 associated with the computer system. However, it will be apparent that at least parts of the aforementioned processes could alternatively be implemented as one or more dedicated hardware components, such as application-specific integrated circuits (ASICs) and/or as configuration data of one or more field programmable gate arrays (FPGAs), for example.

Each system 200 includes random access memory (RAM) 206, at least one processor 208, and interfaces 210, 212, 214, all interconnected by a bus 216. The interfaces include a network interface connector (NIC) 212 which connects the system 200 to a communications network 116, such as the Internet.

Each system 200 also includes an operating system 224 such as Linux or Microsoft Windows, and a number of software modules 226 to 230, including web server software 226 such as Apache, available at http://www.apache.org, scripting language support 228 such as PHP, available at http://www.php.net, or Microsoft ASP, and structured query language (SQL) support 230 such as MySQL, available from http://www.mysgl.com, which allows data to be stored in and retrieved from an SQL database 232. The software/database type/version can vary depending on software/functionality requirements of the issuer and acquirer.

In the described embodiments, the transaction database 125, payment card database 127, and financial product database 129 are databases 232 implemented using SQL and are accessed by a database management system (DBMS) of the transaction processing device 124. The databases 232 can be operated by the one or more software modules 202 implementing the processes 300 and 800. In other embodiments, each of the databases may be implemented on a separate computing device, or across multiple computing devices according to one or more techniques for the distributed processing and storage of data.

Associating the Adaptive Payment Card with a Product

In the adaptive payment card system process the cardholder 101 can dynamically adapt the financial product associated with the adaptive payment card 103 from one or more recommended products that are presented to the cardholder 101 by the issuer 122, where the recommended products are determined based on the characteristics of the cardholder 101. Specifically, the product recommendation engine 131 of the issuer 122 associates a product with the adaptive payment card 103 by performing the steps including:
  analysing:
    transaction data indicative of the payment card transactions of a cardholder made using a payment card issued to the cardholder by the issuing institution and being made in association with a corresponding financial product of the issuing institution; and
    financial product data representing a plurality of financial products of the issuing institution, the financial products including the financial product of the issuing institution associated with the payment card of the cardholder,
  to evaluate financial products of the issuing institution with respect to the payment card transactions of the cardholder;
  generating, based on the evaluation, recommended product data representing one or more alternative financial products of the issuing institution, the alternative financial products being financial products that are recommended by the issuing institution as alternatives to the financial product of the issuing institution associated with the payment card of the cardholder;
  transmitting, via a communications network, the recommended product data to a cardholder device of the cardholder;
  receiving, via the communications network, product confirmation data including an indication of one of the one or more alternative financial products selected by the cardholder; and
  updating the payment card database to store product association data representing an association of the payment card of the cardholder with the selected alternative financial product of the issuing institution, such that future payment transactions made using the payment card will be made in association with the alternative financial product of the issuing institution.

Figure 3:
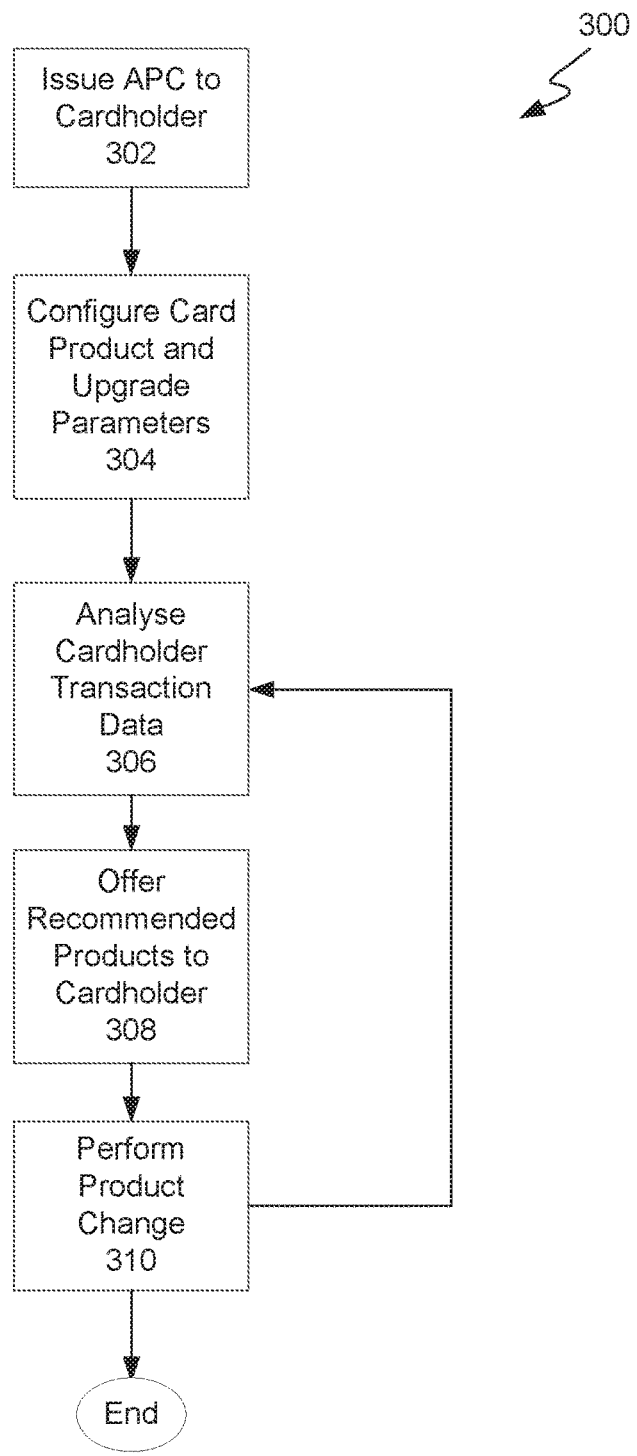
FIG. 3 is a flow diagram of a product association process of an adaptive payment card in accordance with some embodiments of the present invention.

FIG. 3 illustrates the process 300 of associating a product of the issuer 122 with the adaptive payment card 103 as conducted by the issuer devices. At step 302, and adaptive payment card 103 is issued to the cardholder 101. The issuer 122 issues the adaptive payment card 103 to the cardholder 101 by generating, at the product mapper 128, payment card data for the adaptive payment card, including, at least, a card number of the adaptive payment card. The adaptive payment card data is stored in the payment card database 127 of the transaction processing device 124 allowing the issuer 122 to identify payment transactions made with an adaptive payment card 103 during transaction processing (as described below). The issuer 122 performs configuration of the financial product that is initially associated with the adaptive payment card 103, at step 304. Financial products of the issuer 122 are represented by financial product data stored within the financial product database 129. The financial product data can represent a set of rules or conditions that apply to the use of a corresponding payment account of the cardholder 101. For example, a particular credit card product may allow credit transactions to a certain maximum credit value, may have an associated interest rate that applies to the balance of the corresponding account, and may impose particular limits on the value of the transactions made against this payment account.

Payment Card Configuration

Figure 4:
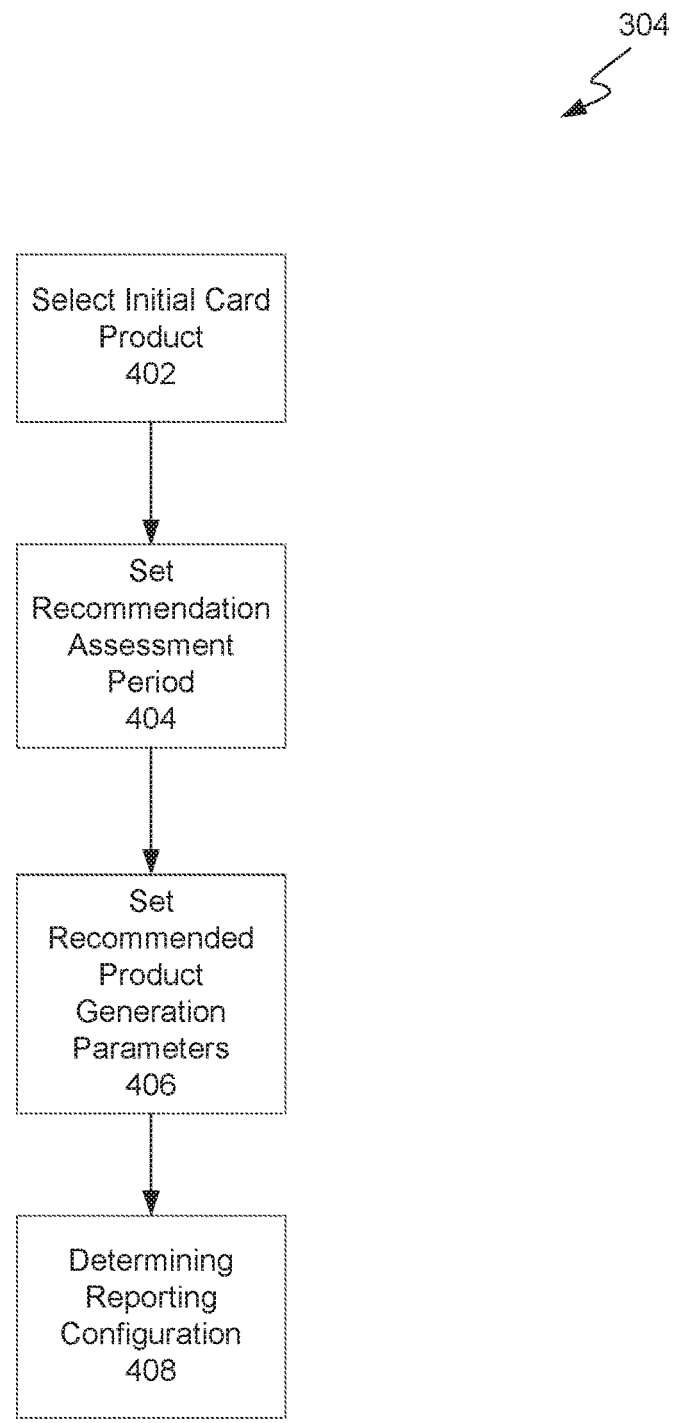
FIG. 4 is a flow diagram of a card product configuration process of the adaptive payment card product association process of FIG. 3.

FIG. 4 illustrates the adaptive payment card configuration process which begins with the selection of an initial product for association with the payment card, at step 402. The initial product selection is made by the cardholder 101 during communications with the issuer 122 at the time at which the adaptive payment card 103 is issued. For example, the cardholder 101 can nominate an initial product when entering into an agreement with the issuer 122 in respect of the product (e.g. when signing up for a credit card), and may choose to utilise the nominated product via an adaptive payment card. The configuration process also involves the determination of the values of one or more parameters that control the generation of recommended products for potential association with the adaptive payment card 103, and the presentation of the determined recommended products to the cardholder 101 for selection.

At step 404, the recommender module 126 of the product recommendation engine 131 determines a recommendation assessment period for the adaptive payment card 103. The recommendation assessment period represents a period of time in which payment transactions made with the adaptive payment card 103 are analysed by the product recommendation engine 131 for the purpose of determining the one or more recommended products (as described below). In the described embodiments, the recommendation assessment period of a particular product (a "first" product) is of a fixed and predetermined duration, and commences at the successful completion of the association of the first product with the adaptive payment card 103. Payment transactions analysed during the recommendation assessment period are used to determine the recommended products from which the cardholder 101 can select for association with the adaptive payment card instead of the current product. The duration of the recommendation assessment period can be set based on any number of arbitrary factors, including the type of the product associated with the adaptive payment card 103 and/or the preferences of the cardholder 101.

In other embodiments, the recommendation assessment period is of a dynamic length and can be determined by the recommender module 126 in response to the transaction activity of the adaptive payment card 103, and defined by an issuer's agreement with each respective cardholder. For example, if the issuer 122 determines that a low frequency of transactions have been made with the adaptive payment card 103 during a particular sub-period of the designated recommendation assessment period, then the recommender module 126 may extend the duration of the period to ensure that a sufficient number of payment transactions are captured to perform over the entire period such as to produce a more accurate analysis.

At step 406, the recommender module 126 sets the value of one or more recommended product generation parameters which determine the process by which recommended products are generated for the adaptive payment card 103 of the cardholder 101. Specifically, the recommended product generation parameters determine whether the recommended products generated for an adaptive payment card 103 are chosen from a set of predetermined candidate recommended products, and if so the particular set of predetermined candidate recommended products from which the recommended products are chosen. Alternatively, the recommended product generation parameters may specify a configuration in which the product recommendation engine 131 dynamically generates recommended products that are customised based on the transaction activity of the cardholder 101, or any one or more other cardholders, using the adaptive payment card system 100.

At step 408, the recommender module 126 determines the reporting configuration for reporting product usage data according to the cardholder 101. In the described embodiments, the reporting configuration is determined by setting reporting parameters which control the frequency with which product usage data is reported to the cardholder 101, the format of the usage report content, the delivery mode of the report, and the format of the report document (i.e. the report file type) if applicable. In the described embodiments, the report data is delivered to the cardholder 101 in the form of an recommended product notification that is transmitted from the recommended product engine 131 to the cardholder device 102 at times when a product change is available to the cardholder 101 (referred to as an "product change time"). The recommended product notification also includes recommended product data indicating the one or more recommended products determined by the issuer 122.

In other embodiments, the cardholder 101 can request the issuer 122 to transmit an additional copy of the product usage report independently to the corresponding recommended product notification including the report, and via a communication means of the cardholder's preference. For example, recommended product notifications may be delivered to the cardholder via SMS, however the recommender module 126 may be configured to also transmit a copy of the report to an email address nominated by the cardholder 101. The format of the product usage report document may be a PDF, TXT, XML, or other markup language file as determined by the issuer 122, and possibly in accordance with the preferences of the cardholder 101. The report configuration parameter values are stored in the recommendation module 126 and are transmitted to the reporting module 132 to facilitate the generation of the report (as described below).

In some embodiments, the card product configuration process 304 also involves the issuer 122 placing one or more restrictions on the usage of the adaptive payment card 103. The restrictions can be determined based on the particular card product selected by the cardholder 101, the characteristics of the cardholder 101 as determined by the product recommendation engine 131 (using the methods described below), or using any other relevant data that is available to the devices of the issuer 122 at the time of performing the card product configuration process 304. Typically, the issuer 122 can determine whether to impose more restrictions as well.

Offering and Performing Card Product Upgrades

With reference to FIG. 3, following the configuration of the initial product and the recommended product generation parameters, the product recommendation engine 131 implements iterative processing involving the steps of: analysing payment transactions made with the adaptive payment card 103; offering one or more recommended products to the cardholder 101; and performing a product change by associating a recommended product selected by the cardholder with the adaptive payment card 103 (at steps 306, 308, and 310 respectively).

Figure 5:
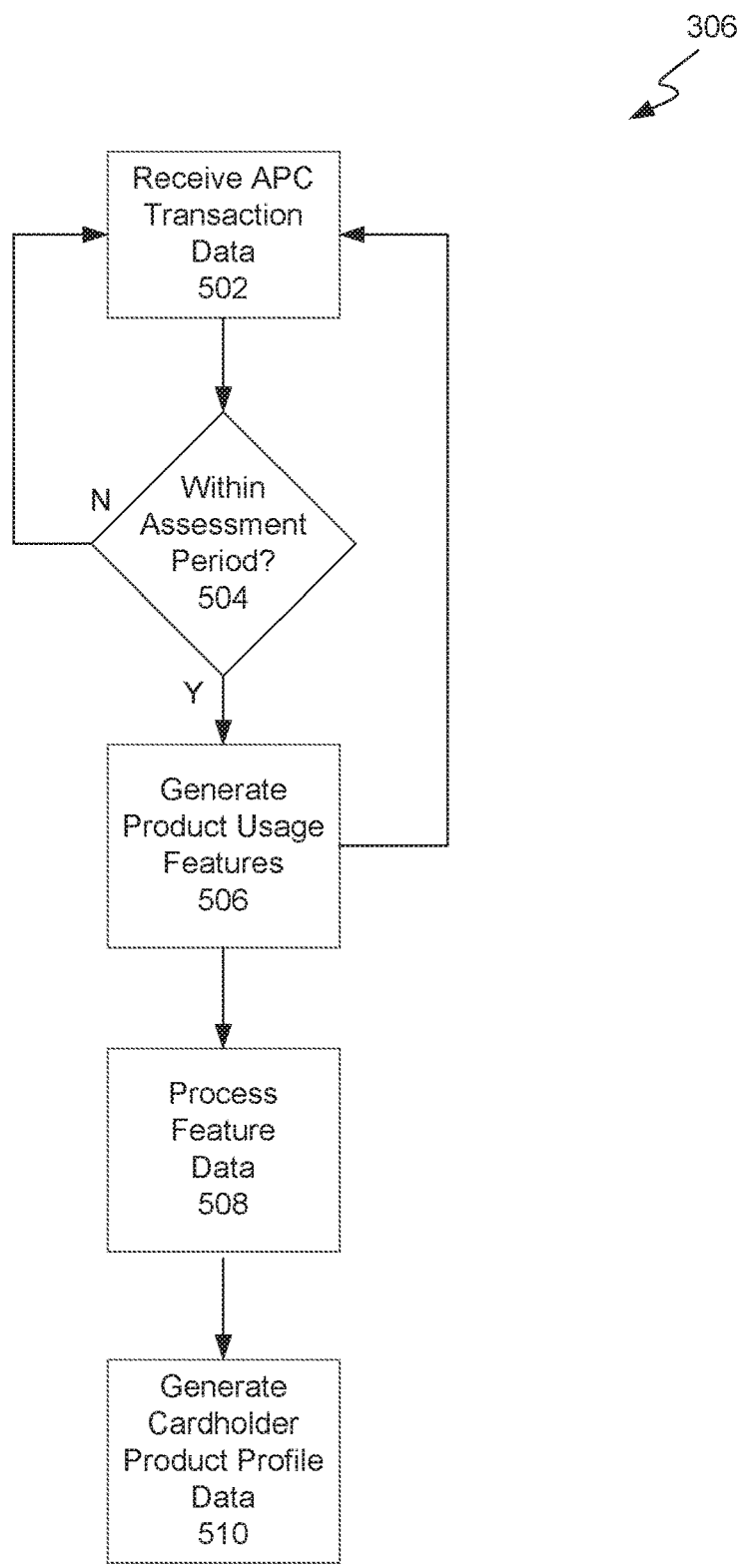
FIG. 5 is a flow diagram of a card transaction data analysis process of the process of FIG. 3.

FIG. 5 illustrates the process of analysing of the transaction data and the financial product by the product recommendation engine, which includes the steps of:

determining whether each of a plurality of payment transactions of the cardholder made with the payment card is a transaction occurring within a recommendation assessment period of the payment card;

generating, if a payment transaction occurs within the recommendation assessment period of the payment card, product usage features for the transaction; and processing the product usage features generated to generate cardholder product profile data representing a profile of the cardholder in relation to one or more of the financial products of the issuing institution.

At step 502, the transaction processing device 124 receives transaction data representing one or more payment transactions performed with the adaptive payment card 103. The transaction processing device 124 determines, for each payment transaction, that the transaction is made with the adaptive payment card 103 by processing the payment card data included in the transaction data. In described embodiments, the transaction data for a payment transaction is in the form of an ISO 8583 standard financial transaction message, such that the transaction processing device 124 extracts the payment card data from the a data field of the transaction message, such as the PAN field or any other data field designated by the system to store the card number. The payment card number of the transaction is resolved, by the product mapper 128 of the transaction processing device 124, to the payment card number of the adaptive payment card 103. The transaction processing device 124 generates cardholder identification data identifying the cardholder 101 of the adaptive payment card 103.

In the described embodiments, the transaction processing device 124 invokes the product mapper module 128 to determine product identification data representing the product that is currently associated with the adaptive payment card 103. The product mapper module 128 performs a lookup operation on an payment card database to retrieve the corresponding payment card number of a virtual payment card that represents the current product for the cardholder 101 (as described below). The product mapper 128 processes the virtual payment card number and accesses the financial product database 129 to generate corresponding product identification data, such as for example an indication of the product type (e.g. credit/debit card), the payment account data of the cardholder's corresponding payment account for the product, and the data representing other product attributes (such as for example interest rates, transaction fee values, etc.) as specific to the product type. The transaction processing device 124 utilises the transaction data, product identification data, and adaptive payment card data (in the form of the payment card number) to process the transaction for the purpose of completing a payment in respect of the product, as described below.

To facilitate a product change for the adaptive payment card 103, received payment transactions are analysed by the product recommendation engine 131. The recommendation module 126 is invoked by the product recommendation engine 131 at a predetermined scheduled product change time based on the transaction data, product identification data, and adaptive payment card data provided to the product recommendation engine 131 from the transaction processing device 124 via the communications module 133. The recommendation module 126 accesses the transaction data of the cardholder 101 via the transaction database 125 of the transaction processing device 124.

At step 504, the recommendation module 126 determines whether the payment transaction is a transaction occurring within the recommendation assessment period of the adaptive payment card 103. The recommendation assessment period data for each adaptive payment card issued by the issuer 122 is maintained within the payment card database 127 of the transaction processing device 124. In the described embodiments, the start and end date-time values of the recommendation assessment period are retrieved by the recommendation module 126 based on the adaptive payment card number. If the transaction date of the received payment transaction occurs within the recommendation assessment period, as defined by the recorded start and end date-time values for the recommendation assessment period, then, at step 506, product usage features are generated for the transaction. In described embodiments, the transaction processing device 124 transmits the payment transaction data to the analysis module 130 which generates product usage features including: a transaction value; and values for each of one or more transaction categories that apply to the transaction. The transaction categories are determined by processing the transaction data, including the merchant identifier, the transaction date, and any other information included within the transaction data that is relevant to the payment, and comparing this data to one or more predetermined categories known to the analysis module 130.

For example, a transaction for a purchase from the merchant "ABC grocer" with a value of $14.00 and at a transaction time of 19:54 may have feature values of 14 and 'Food' indicating that the transaction is for a purchase of food based items. The features may be represented by a vector, an array, or any other appropriate data structure, within the analysis module 130. The skilled addressee will note that the analysis module 130 may be configured to generate values for any other arbitrary product usage features determined from the transaction data additionally, or as an alternative, to those described hereinabove. The feature generation process of step 506 is repeated for each payment transaction received by the transaction processing module 124 that occurred within the recommendation assessment period of the adaptive payment card 103.

At step 508, the analysis module 130 processes the product usage features generated from the one or more payment transactions made with the adaptive payment card 103, and that occurred within the recommendation assessment period. In the described embodiments, the processing of the product usage features includes applying pattern classification and/or statistical analysis to one or more of the product usage features to produce one or more usage scores of the cardholder 101 with respect to the financial product. The usage scores can be determined in relation to one or more usage categories that are predetermined by the issuer 122, as described above.

At step 510, the analysis module 130 generates cardholder product profile data representing a profile of the cardholder 101 in relation to one or more of the financial products of the issuer 122. In the described embodiments, the analysis module 130 generates the cardholder product profile data by processing one or more of the usage scores determined in relation to corresponding usage categories. For example, consider the product usage features of: [14, 'Food'], [50, 'Bills'], and [123, 'Entertainment']. The analysis module 130 analyses the product usage features to produce usage scores of +20 and +10 for the usage categories of "low value" and "regularity". It should be appreciated that the usage categories can be associated with merchant categories which can be tracked by DE18 (MCC) and all categories supported by issuer can be utilised.

In generating the cardholder product profile data, the analysis module 130 can be configured to process the one or more usage scores to determine one or more usage characteristics data for the cardholder 101, with respect to a financial product of the issuer. The usage characteristics represented by the usage characteristics data may correspond to the usage categories, or may be determined separately. In the example above, the cardholder product profile indicates that the cardholder 101 uses the product primarily for low value purchases that are made with high regularity, and usage characteristics can be attributed to the cardholder 101 to reflect this.

In some embodiments, the analysis module 130 is configured to process one or more of the usage scores, and cardholder identity data indicating the identity of the cardholder 101, to determine one or more behavioural characteristics of the cardholder with respect to a product of the issuer. The determination of the behavioural characteristics can be used by the issuer to assess and profile the cardholder. For example, in the case of a cardholder with the aforementioned cardholder product profile, the analysis module 130 may attribute behavioural characteristics of "low risk of default" and "non-impulsive purchaser" to the cardholder 101. The behavioural characteristics assigned to a particular cardholder 101 may be determined from a set of characteristics that are preconfigured by the issuer 122 and stored in the analysis module 130. The analysis module 130 can perform pattern classification and/or statistical analysis to choose the particular behavioural and/or usage characteristics that apply to the cardholder 101, given their cardholder product profile data.

Figure 6:
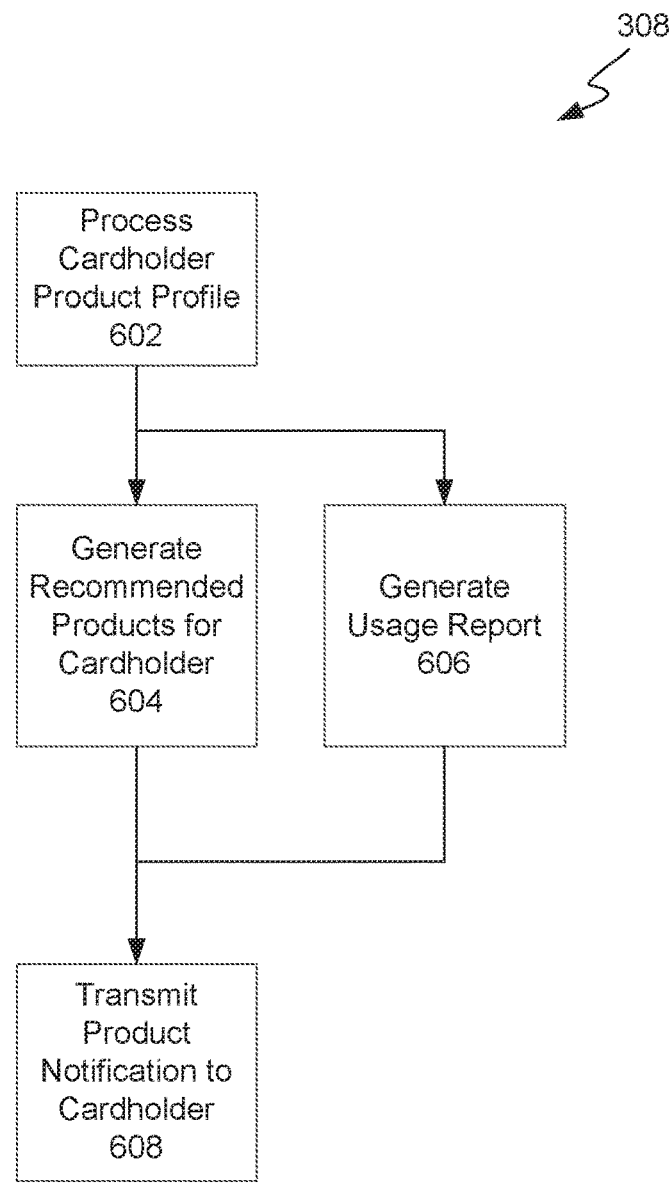
FIG. 6 is a flow diagram of a process for offering an upgrade of the product of the adaptive payment card product association process.

With reference to FIG. 3, at step 308 the issuer 122 offers one or more recommended products, in the form of alternatives to the financial product of the issuer 122 that is currently associated with the payment card 103 of the cardholder 101, from which the cardholder 101 can select for association with the adaptive payment card 103. The recommended products are offered to the cardholder 101 at an product change time occurring after the lapse of the recommendation assessment period. As shown in FIG. 6, the recommendation module 126 generates recommended product data representing the one or more recommended products for the particular adaptive payment card 103. The recommended products are presented to the cardholder 101 at a scheduled product change time, as described below. For example, the scheduled product change time can be when a recommendation assessment period ends.

In the described embodiments, generating the recommended product data includes processing the cardholder product profile data of the cardholder 101 (at step 602). The recommendation module 126 then determines one or more recommended products of the issuer 122 based on at least one of the characteristics of the cardholder 101, including behavioural and/or usage characteristics (at step 604). In some embodiments of the system 100, the recommended products are selected from one or more predetermined candidate recommended products. In such embodiments, the recommended products are selected by comparing the usage and/or behavioural characteristics, as determined from the cardholder product profile, to corresponding characteristics of each of the predetermined candidate recommended products, as represented by the respective financial product data of the financial product database 129. For example, the issuer 122 may define a set of candidate recommended products of a credit product type with varying terms and conditions, where each recommended product is aimed for cardholders possessing a different degree of an 'impulsiveness' behavioural characteristic.

In other embodiments, the one or more recommended products are selected from one or more dynamic recommended products. The dynamic recommended products are generated by the recommendation module 126 specifically for the cardholder 101 based on one or more of the usage and/or behavioural characteristics of the cardholder 101. The recommendation module 126 can be configured to process the cardholder product profile data of the cardholder 101, as generated by the analysis module 130, to generate recommended (financial) product data representing one or more recommended products that are customised for the cardholder 101. For example, the recommendation module 126 may process the usage characteristics, and/or corresponding usage score data, of the cardholder product profile determined by the analysis module 130 to determine candidate recommended products that are similar to the current product of the cardholder 101 (e.g. products that are of the same type).

Alternatively, or in addition, the candidate recommended products may be configured with product parameters that are modified from those of the current product in a way that is particularly beneficial to the cardholder 101 and/or the issuer 122. For example, the product parameters may specify particular interest rates, transaction fees, cashback features, surcharge waivers or other product attributes that are likely to appeal to the cardholder 101 based on their use of the current product. The dynamic generation of candidate recommended products by the recommendation module 126 can involve the use of recommended product generation rules to determine the candidate recommended product parameters based on the cardholder product profile data, such as via predetermined mappings. Alternatively, or in addition, the recommendation module 126 can be configured to use pattern classification techniques to optimise the generation of candidate recommended product parameter data based on the cardholder product profile data.

In the described embodiments, the recommended product data generated by the recommendation module 126 includes usage report data representing a usage report of the cardholder's usage of the current product. The recommendation module 126 invokes the reporting module 132 which processes the usage characteristics of the cardholder 101 product profile data to produce the usage report. The issuer 122 can customise the content of the usage report that is generated by the reporting module 132 based on one or more attributes of the current product, as represented by corresponding financial product data. In some embodiments, the reporting module 132 is configured to store report template data defining one or more report templates for each respective product type. The templates are used by the reporting module 132 to generate the usage report data in a predetermined reporting form.

At step 608, the product recommendation engine 131 transmits product notification data to the cardholder device 102 in a predetermined form, such as an product notification message. In the described embodiments, the product notification message contains an indication of the one or more recommended products determined at step 604, and the usage report data determined at step 606. In some embodiments, the usage report data is included in the product notification message in the form of a link to a usage report document. The usage report document can be a PDF, TXT, XML or other markup language document file type, as generated in accordance with the preferences of the issuer 122 and/or cardholder 101, and is stored on the product recommendation engine 131 within a usage report database. In other embodiments, the contents of the usage report can be embedded directly into the product notification message as an alternative, or in addition, to the inclusion of a link to the report document. In one particular embodiment where the product notification data is delivered as an SMS message, the body of the message may contain some, or all, of the usage report information (such as, for example, a summary of one or more key product usage statistics).

In some embodiments, the cardholder 101 can query product recommendation engine 131 of the issuer 122 for information relating to the current product associated with the adaptive payment card 103. The query can request the issuer 122 to provide information including, but not limited to, usage information representing the cardholder's usage of the current product, and current product identity information (such as the product name and the financial parameters of the product). Queries can be transmitted to the product recommendation engine 131 from the cardholder device 102, using SMS, email, a mobile banking application of the issuer 122, or a web browser application that is configured to access an IBS of the issuer 122.

Figure 7:
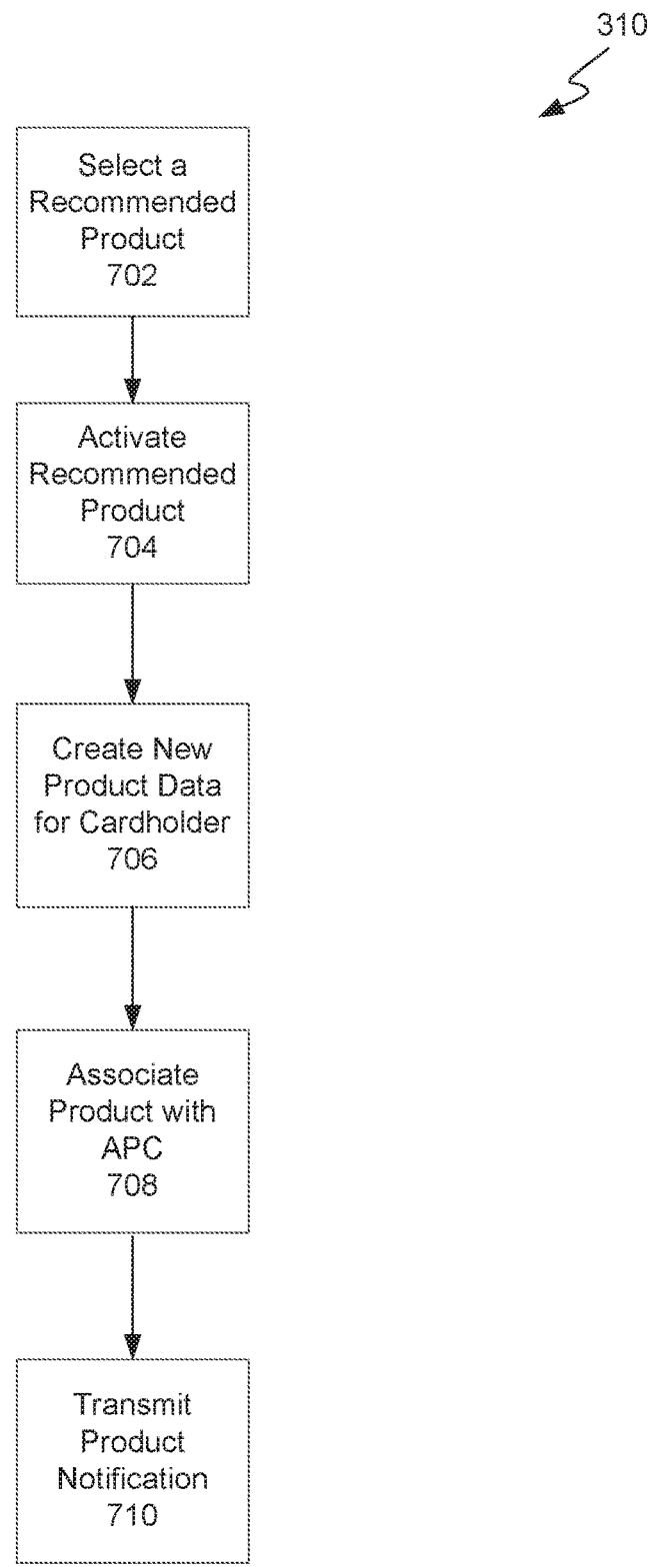
FIG. 7 is a flow diagram of a process for performing an upgrade of the product of the adaptive payment card product association process.

With reference to FIG. 3, the current product of the adaptive payment card 103 is changed, at step 310. FIG. 7 illustrates the product change process which commences with the cardholder device 102 receiving product notification data from the product recommendation engine 131. The product notification data is received by the communications module 106, and is passed to the user application 108 with which the cardholder 101 interacts (as described above). An indication of the one or more recommended products and the corresponding usage report is displayed on the user interface 104 of the cardholder device 102. To confirm the association of a new product with the adaptive payment card 103, the cardholder 101 engages in a two-step process of: 1) selecting the new product from the one or more recommended products (i.e., the alternative financial products), as described above; and 2) activating the selected new product with the issuer 122.

At step 702, the cardholder 101 selects the new product to be associated with the adaptive payment card 103, where the selection is performed using the cardholder device 102, which is a remote display device configured to:

receive recommended product data generated by the product recommendation engine via the communication network;

generate product display data representing the one or more alternative financial products of the recommended product data, display a representation of each of the one or more alternative financial products of the recommended product data to a user of the cardholder device via an interactive graphical user interface;

receive input from the user indicating a selection of one of the one or more alternative financial products (the "new product") displayed on the interactive graphical user interface;

generate product confirmation data including an indication of the one of the one or more alternative financial products selected by the cardholder; and transmit the product confirmation data to the product recommendation engine via the communication network.

At step 704, the cardholder 101 activates the new product to confirm that this product is to be associated with the adaptive payment card 103 instead of the current product. In the described embodiments, the activation process involves the generation of verification data by the cardholder device 102 to verify the identity of the cardholder 101 for the purpose of ensuring that the selection of the new product via the cardholder device 102, as described above, was authorised by that cardholder (and not by, for example, an unauthorised party who had access to the cardholder device 102). The verification data includes one or more of: identification data representing the identity of the cardholder, including the cardholder's name, address, phone number; and email address; and an identifier of the adaptive payment card, including the card number, an indication of the issuer, and the card ICA value. The verification data is generated based on input provided by the cardholder 101 to the cardholder device 102. To complete the activation process, the cardholder device 102 generates product confirmation data, including: an indication of the selection of the new product from the one or more recommended products; and the verification data verifying the identity of the cardholder 101 for the purpose of associating the new product with the adaptive payment card 103.

The product confirmation data is received by the product recommendation engine 131, and is processed by the recommendation module 126. The recommendation module 126 processes the verification data of the product confirmation data. If the verification data matches corresponding data stored within a customer records database of the issuer 122, then the association of the adaptive payment card 103 with the new product is authenticated.

At the product recommendation engine 131 of the issuer 122, completion of the product change process involves: 1) the creation of the new product data for the cardholder 101; 2) the association of the new product data with the adaptive payment card 103; and 3) the notification of the card entity 120 of the product upgrade to that the card entity 120 informs all relevant parties of the product change. At step 706, new product data is created for the new product selected by the cardholder 101 to associate with the adaptive payment card 103.

In the described embodiments, the new product data is created by the product mapper 128 on invocation by the recommendation module 126, and includes payment card data of a payment card representing the new product for the cardholder 101. Specifically, the product mapper 128 generates virtual payment card data including: a virtual payment card number; a card expiry date; a card ICA value; and a card CVV code. The virtual payment card data also includes a product key that uniquely specifies the financial product data of the new product, as stored in the financial product database 129. The virtual payment card data is stored within the payment card database 127 of the issuer transaction processing device 124, and represents an abstraction of the physical payment card that would conventionally be created and issued to the cardholder 101 in association with the new product. Financial product data of the new product, such as for example the PAN of the corresponding payment account, and the parameters that determine the financial characteristics of the product (such as interest rates and fee values), are stored within the financial product database 129.

At step 708, the issuer 122 generates product association data of the adaptive payment card data which represents the association of the adaptive payment card 103 with the new product. The product association data for the adaptive payment card 103 is in the form of a reference to the virtual payment card data, as stored within the payment card database 127. That is, the product association data of the adaptive payment card data refers to a virtual payment card (i.e., instead of a financial product identifier), where the virtual payment card is linked to the new product (product BIN range needs to be changed, in turn changing the virtual payment card number). This allows virtual payment card data to be created and removed within the transaction processing device 124 databases in respect of financial products selected by cardholders, such that a physical payment card (i.e., the adaptive payment card) possessed by a cardholder can remain static irrespective of product changes (since the product association data for a particular product is merely a reference to the corresponding virtual card). The product mapper 128 updates the payment card database 127 such that the payment card data of the adaptive payment card 103 includes the generated product association data. Following the update, the transaction processing device 124 resolves the payment card number of the adaptive payment card 103 to the corresponding number of the virtual payment card for the purpose of processing a transaction made with the adaptive payment card 103.

In some embodiments, the issuer 122 can be configured to buffer virtual payment card data, and corresponding product association data of the adaptive payment card 103, prior to performing product change. This allows the product recommendation engine 131 of the issuer 122 to restore the current (i.e. old) product of an adaptive payment card 103 after the completion of a product change, either at the request of the cardholder 101 or otherwise. Following the generation of the product association data linking the adaptive payment card 103 to the virtual payment card of the new product, and the buffering operations as described above (if applicable), a cleanup process is performed on the payment card database 125 to remove the association of the old product with the adaptive payment card 103 (i.e. to delete the corresponding product association data and/or virtual payment card data). The recommendation module 126 resets the recommendation assessment period by determining new start and end date-time values that specify the period in which received payment transactions will be analysed for the new product (i.e. the recommendation assessment period), as described above.

At step 710, the issuer 122 notifies the card entity 120 of the change in the product associated with the adaptive payment card 103. In the described embodiments, the issuer 122 transmits product notification data to the card entity 120 to indicate the association of the adaptive payment card 130 with the new product. The card entity 120 would only receive the information related to virtual card number associated with the actual card number which can be passed to PAN mapping system for the required changes to occur.

Performing a Transaction with the Adaptive Payment Card

Following the association of a product with the adaptive payment card 103, either at the issuance of the adaptive payment card 103 or as a result of an upgrade performed to the card as described hereinabove, the issuer 122 processes payment transactions made with the adaptive payment card 103 by:

receiving, at a transaction processing device, payment transaction data representing a payment transaction made using a payment card issued to a cardholder by an issuing institution and being made in association with a corresponding financial product of the issuing institution, the financial product being associated with the payment card according to the processes described herein above;

determining, at a transaction processing device, payment card data of the payment card of the transaction;

processing, at a transaction processing device, the payment card data to determine the financial product of the issuing institution associated with the payment card based, at least in part, on product association data representing an association of the payment card of the cardholder with the financial product;

generating, at a transaction processing device, financial product transaction data, said financial product transaction data representing a supplementary payment transaction that corresponds to the received payment transaction; and processing, at a transaction processing device, the supplementary payment transaction in accordance with a financial payment transaction processing protocol.

Figure 8:
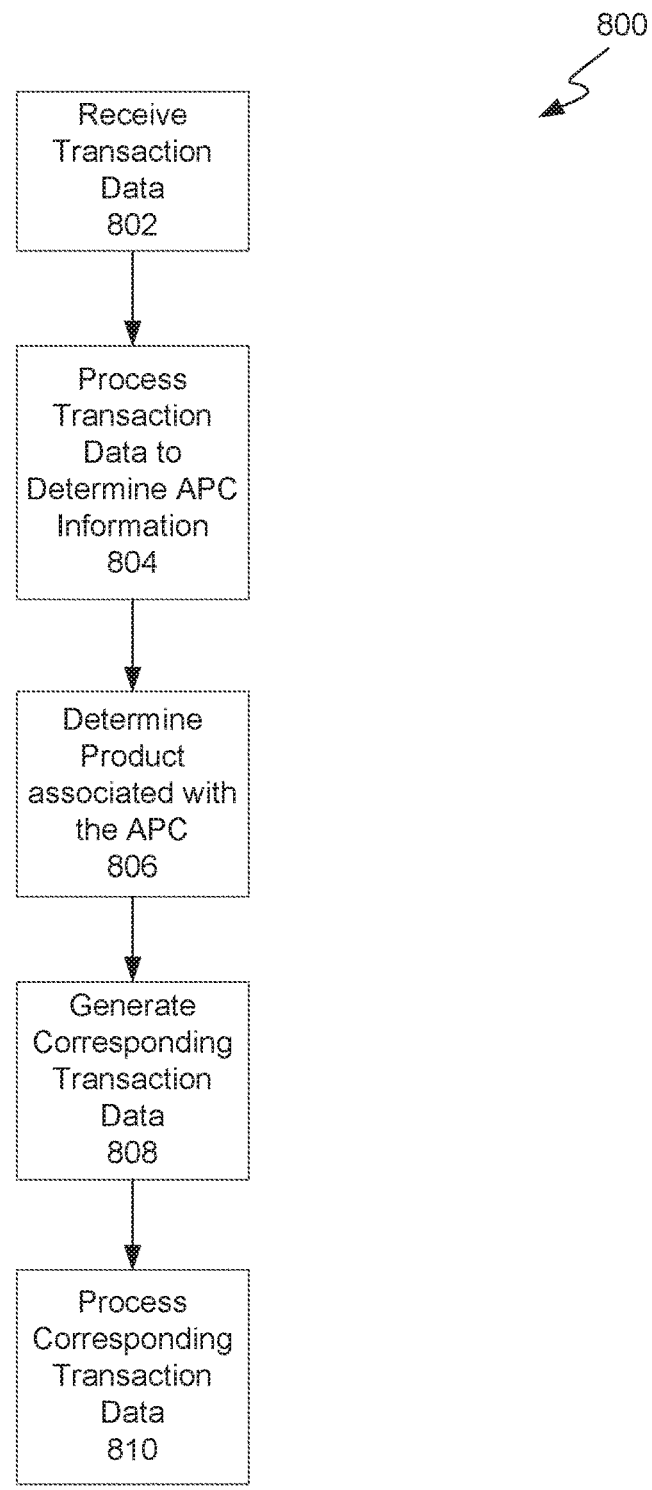
FIG. 8 is a flow diagram of a process for conducting a payment transaction with the adaptive payment card in accordance with some embodiments of the present invention.

FIG. 8 illustrates the steps performed by the transaction processing device 124 of the issuer 122 to process a payment transaction made by the cardholder 101 at a payment device 110. At step 802, the issuer 122 receives the payment transaction data from the card entity 120. In some embodiments, the payment transaction data received from the card entity 120 includes an indication that the payment transaction is a transaction made with an adaptive payment card. The indication enables maintenance of an account of transactions performed with the adaptive payment card. In the described embodiments, the card entity 120 determines that the payment transaction is a transaction made with the adaptive payment card 103 by matching adaptive payment card data to a corresponding entry maintained by the adaptive payment card register (APC register) 121 of the card entity 120. For each adaptive payment card issued by a particular issuer 122, an APC register 121 entry is generated by the card entity 120 when product notification data is received from the product recommendation engine 131 of the issuer 122 by the card entity 120. The card entity 120 requires details of the adaptive payment card as PAN-mapping services and related setups require updating based on the product upgrade.

At step 804, the transaction data is processed by the transaction processing device 124 to determine the corresponding adaptive payment card data, including the payment card number (which is extracted from the transaction data, as described hereinabove). At step 806, the product associated with the adaptive payment card 103 is determined from the adaptive payment card data. The product mapper 128 is invoked to determine the payment card number of the corresponding virtual payment card by accessing the payment card database 125. The product mapper 128 retrieves corresponding product data from the financial product database 129 based on the payment card number of the virtual payment card referenced by the product association data of the adaptive payment card 103. The virtual payment card data includes an indication of a payment account linked to the product, and the product data includes parameters specifying the terms and conditions of the product, as described above.

At step 808, the transaction processing device 124 generates transaction data representing a supplementary transaction that is to be conducted on the payment account linked to the virtual payment card. In some embodiments, the supplementary transaction data includes, for example, actual payment card number, product data, and so forth. The transaction processing device 124 can be configured to replicate particular fields of the received payment transaction within the supplementary transaction data, such as the transaction value.

At step 810, the transaction processing device 124 processes the supplementary transaction data in accordance with existing methods for financial transaction processing, such that the supplementary transaction is performed with respect to the product currently associated with the adaptive payment card 103. On successful completion of the supplementary transaction, transaction response data is generated by the transaction processing device 124. In the described embodiments, the transaction response data is in the form of an ISO 8583 authentication response message or transaction response message, with message type indicator values of 0110 or 0210 respectively. The transaction response data is transmitted to the card entity 120 to indicate the success of the transaction. The card entity 120 subsequently forwards the transaction response data to the acquirer 118, and/or payment device 110, in accordance with standard processes for financial message processing.

Many modifications will be apparent to those skilled in the art without departing from the scope of the present invention.

Throughout this specification, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavor to which this specification relates.

The invention claimed is:

1. A payment system, comprising:
a transaction processing device configured to process transaction information about payment card transactions of a cardholder made using a payment card issued to the cardholder by an issuing institution and being made in association with a financial product of the issuing institution, the payment card being identified by a fixed payment card number, said transaction processing device including:
a transaction database storing transaction data indicative of the payment card transactions of the cardholder;
a payment card database storing payment card data, said payment card data including product association data representing an association of the fixed payment card number with a first virtual card number associated with the financial product of the issuing institution; and
a financial product database storing financial product data representing a plurality of financial products of the issuing institution, the plurality of financial products including the financial product of the issuing institution;
a product recommendation engine including:
a communications interface to receive data;

at least one computer processor to execute program instructions; and a memory, coupled to the at least one computer processor, to store program instructions for execution by the at least one computer processor to automatically:

access the transaction data stored in the transaction database and the financial product data of the financial product database;

analyze the transaction data and the financial product data to evaluate the plurality of financial products of the issuing institution with respect to the payment card transactions of the cardholder;

generate, based on the analysis, recommended product data representing one or more recommended financial products of the issuing institution, the one or more recommended financial products each being a recommended financial product that is recommended by the issuing institution as an alternative to the financial product of the issuing institution that is currently associated with the payment card of the cardholder;

transmit, via a communications network, the recommended product data to a cardholder device of the cardholder;

receive, via the communications network, product confirmation data including an indication of a selection of a recommended financial product from among the one or more recommended financial products; and update the payment card database to store product association data representing an association of the fixed payment card number with a second virtual card number associated with the selected recommended financial product, such that future payment transactions made using the payment card will be made via the second virtual card number associated with the selected recommended financial product instead of the first virtual card number associated with the financial product of the issuing institution.

2. The payment system of claim 1, further comprising the cardholder device, wherein the cardholder device is configured to:

receive, via the communication network, the recommended product data generated by the product recommendation engine;

generate product display data representing the one or more recommended financial products of the recommended product data to display a representation of each of said one or more recommended financial products via an interactive graphical user interface;

receive input indicating the selection of the recommended financial product;

generate the product confirmation data; and transmit the product confirmation data to the product recommendation engine via the communication network.

3. The payment system of claim 1, wherein, when the payment card is associated with the selected recommended financial product of the issuing institution, payment card data of the payment card is resolved to corresponding payment card data of the second virtual payment card of the selected recommended financial product.

4. The payment system of claim 1, wherein to analyze the transaction data and the financial product, the at least one computer processor is further to:

determine whether each of a plurality of payment transactions of the cardholder made with the payment card occurred within a recommendation assessment period of the payment card;

generate, if a payment transaction occurred within the recommendation assessment period of the payment card, product usage features for the payment transaction; and generate, based on the product usage features, cardholder product profile data representing a profile of the cardholder in relation to one or more of the plurality of financial products of the issuing institution.

5. The payment system of claim 4, wherein to generate the product usage features, the at least one computer processor is further to:

determine one or more transaction categories that apply to the payment transaction, Wherein to generate the cardholder product profile data based on the product usage features, the at least one computer processor is further to apply pattern classification and/or statistical analysis techniques to one or more of the product usage features to produce one or more usage scores of the cardholder with respect to the financial product, and determine, based on the one or more usage scores, one or more usage characteristics of the cardholder with respect to the one or more of the plurality of financial products of the issuing institution.

6. The payment system of claim 5, wherein to generate the cardholder product profile data, the at least one computer processor is further to: determine, based on at least one of the one or more usage scores and cardholder identity data, one or more behavioural characteristics of the cardholder with respect to the one or more of the plurality of financial products of the issuing institution.

7. The payment system of claim 6, wherein to generate the recommended product data, the at least one computer processor is further to: determine, based on the cardholder product profile data, the one or more recommended financial products of the issuing institution based on at least one of: the one or more behavioural characteristics of the cardholder product profile data and the one or more usage characteristics of the cardholder product profile data.

8. The payment system of claim 6, wherein the one or more recommended financial products arc selected from one or more pre-determined candidate recommended products generated based on a comparison of the one or more behavioural characteristics of the cardholder product profile data and/or the one or more usage characteristics of the cardholder product profile data to corresponding characteristics assigned to the one or more pre-determined candidate recommended products.

9. The payment system of claim 6, wherein the one or more recommended financial products are selected from one or more dynamic recommended products, said dynamic recommended products generated by the issuing institution for the cardholder based on the one or more behavioural characteristics of the cardholder product profile data and/or the one or more usage characteristics.

10. The payment system of claim 8, wherein to generate the recommended product data, the at least one computer processor is further to: generate usage report data representing a usage report of the usage of the financial product of the issuing institution that is currently associated with the payment card of the cardholder, the usage report data being generated based on the usage characteristics of the cardholder product profile data, and wherein the recommended product data is transmitted to the cardholder device within product notification data, the product notification data representing a product notification message of a pre-determined form.

11. The payment system of claim 1, wherein the product confirmation data includes: verification data verifying an identity of the cardholder, the verification data comprising one or more of: an identifier of the cardholder, including: a cardholder name; address; phone number; and
email address; and an identifier of the payment card, including: a card number; an indication of the issuing institution; and the card ICA value.

12. The payment system of claim 1, wherein to update the payment card database, the at least one computer processor is further to:
generate product association data representing a mapping of the payment card data of the payment card of the cardholder to corresponding payment card data of the second virtual payment card number.

13. The payment system of claim 1, wherein the at least one computer processor is further to:
transmit card entity product notification data to a card entity device, the card entity product notification data indicating the association of the payment card of the cardholder with the selected recommended financial product of the issuing institution, wherein the card entity product notification data includes product usage condition data indicating one or more conditions of use of the selected recommended financial product.

14. A process for associating a financial product of an issuing institution with a payment card, including:
analyzing, by at least one computer processor, transaction data and financial product data, the transaction data being indicative of payment card transactions of a cardholder made using a payment card issued to the cardholder by the issuing institution and being made in association with a financial product of the issuing institution and the financial product data representing a plurality of financial products of the issuing institution, the plurality of financial products including the financial product of the issuing institution associated with the payment card of the cardholder, the payment card being identified by a fixed payment card number;
generating, by the at least one computer processor based on the analyzing, recommended product data representing one or more recommended financial products of the issuing institution, the one or more recommended financial products each being a recommended financial product that is recommended by the issuing institution as an alternative to the financial product of the issuing institution associated with the payment card of the cardholder;
transmitting, by the at least one computer processor, via a communications network, the recommended product data to a cardholder device of the cardholder;
receiving, by the at least one computer processor, via the communications network, product confirmation data including an indication of a selection of a recommended financial product from among the one or more recommended financial products; and
updating, by the at least one computer processor, a payment card database to store product association data representing an association of the fixed payment card number with a second virtual card number associated with the selected recommended financial product, such that future payment transactions made using the payment card will be made via the second virtual card number associated with the selected recommended financial product instead of a first virtualcard number associated with the financial product of the issuing institution.

15. The process of claim 14, including:
receiving, via the communication network, at the cardholder device, the recommended product data;
generating, at the cardholder device, product display data representing the one or more recommended financial products of the recommended product data to display a representation of each of said one or more recommended financial products to a user of the cardholder device via an interactive graphical user interface;
receiving, at the cardholder device, input indicating the selection of the recommended financial product;
generating, at the cardholder device, the product confirmation data; and
transmitting from the cardholder device the product confirmation data-via the communication network.

16. The process of claim 14, wherein, when the payment card is associated with the selected recommended financial product of the issuing institution, payment card data of the payment card is resolved to corresponding payment card data of a virtual payment card of the selected recommended financial product, the payment card data including, at least, a card number of the payment card.

17. The process of claim 14, wherein the analyzing the transaction data and the financial product data includes:
determining whether each of a plurality of payment transactions of the cardholder made with the payment card occurred within a recommendation assessment period of the payment card;
generating, if a payment transaction occurred within the recommendation assessment period of the payment card, product usage features for the payment transaction; and
generating cardholder product profile data representing a profile of the cardholder in relation to one or more of the plurality of financial products of the issuing institution.

18. The process of claim 17, wherein generating the product usage features comprises:
determining one or more transaction categories that apply to the payment transaction, wherein generating the cardholder product profile data based on the product usage features includes applying pattern classification and/or statistical analysis techniques to one or more of the product usage features to produce one or more usage scores of the cardholder with respect to the financial product and determining, based on the one or more usage scores, one or more usage characteristics of the cardholder with respect to the one or more of the plurality of financial products of the issuing institution.

19. The process of claim 18, wherein generating the cardholder product profile data includes determining, based on at least one of the one or more usage scores and cardholder identity data, one or more behavioural characteristics of the cardholder with respect to the one or more of the plurality of financial products of the issuing institution.

20. The process of claim 19, wherein generating the recommended product data includes determining, based on the cardholder product profile data, the one or more recommended financial products of the issuing institution based on at least one of: the one or more behavioural characteristics of the cardholder product profile data and the one or more usage characteristics of the cardholder product profile data.

21. A systems of using a dynamic payment card, comprising:

a processor programmed to:
store, in an adaptive payment card register, a first association between a first virtual card number and a fixed payment card number of the dynamic payment card issued to a cardholder, the first virtual card number identifying a first card account having a first set of card characteristics and the first association indicating that the first card account is to be used for payment transactions involving the fixed payment card number;
receive a first request message for a first payment transaction, the first request message specifying the fixed payment card number;
identify the first virtual card number based on the fixed payment card number and the first association;
process the first payment transaction based on the first virtual card number;
receive an indication that the fixed payment card number has been switched from the first card account to a second card account having a second set of card characteristics, the second card account being identified by a second virtual card number;
update the adaptive payment card register to store a second association between the second virtual card number and the fixed payment card number, the second association indicating that the second card account, instead of the first card account, is to be used for payment transactions involving the fixed payment card number;
receive a second request message for a second payment transaction, the second request message specifying the fixed payment card number;
identify the second virtual card number based on the fixed payment card number and the second association: and
process the second payment transaction based on the second virtual card number instead of the first virtual card number.

* * * * *